United States Patent
Fujita

(10) Patent No.: US 9,288,391 B2
(45) Date of Patent: Mar. 15, 2016

(54) IMAGE PICKUP APPARATUS, IMAGE PICKUP SYSTEM, AND METHOD OF CONTROLLING IMAGE PICKUP APPARATUS

(71) Applicant: CANON KABUSHIKI KAISHA, Tokyo (JP)

(72) Inventor: Atsushi Fujita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/107,371

(22) Filed: Dec. 16, 2013

(65) Prior Publication Data

US 2014/0176758 A1 Jun. 26, 2014

(30) Foreign Application Priority Data

Dec. 20, 2012 (JP) ................. 2012-277880

(51) Int. Cl.
*H04N 5/232* (2006.01)
*H04N 5/235* (2006.01)
*H04N 9/73* (2006.01)

(52) U.S. Cl.
CPC ......... *H04N 5/23245* (2013.01); *H04N 5/2327* (2013.01); *H04N 5/2353* (2013.01); *H04N 5/2356* (2013.01); *H04N 5/23212* (2013.01); *H04N 5/23219* (2013.01); *H04N 5/23254* (2013.01); *H04N 9/735* (2013.01)

(58) Field of Classification Search
CPC ............................ H04N 5/2353; H04N 5/353
USPC ........................ 348/239, 222.1, 362, 363, 365
See application file for complete search history.

(56) References Cited

U.S. PATENT DOCUMENTS

2006/0044444 A1* 3/2006 Okamoto et al. ........ 348/333.05

FOREIGN PATENT DOCUMENTS

JP 2006-067464 A 3/2006

* cited by examiner

*Primary Examiner* — Tuan Ho
(74) *Attorney, Agent, or Firm* — Cowan, Liebowitz & Latman, P.C.

(57) ABSTRACT

An image pickup apparatus includes a shooting scene determining unit configured to determine a shooting scene, a selecting unit configured to select a bracket shooting from a plurality of bracket shootings which alter parameters in different ways from each other, based on the shooting scene determined by the shooting scene determining unit, and an image pickup unit configured to perform the bracket shooting selected by the selecting unit, and the selecting unit selects one type of bracket shooting even when the shooting scene determined by the shooting scene determining unit is suitable for at least two types of bracket shootings in the plurality of bracket shootings.

19 Claims, 7 Drawing Sheets

IMAGE PICKUP APPARATUS, IMAGE PICKUP SYSTEM, AND METHOD OF CONTROLLING IMAGE PICKUP APPARATUS

BACKGROUND OF THE INVENTION

1. Field of the Invention

The present invention relates to an image pickup apparatus which performs bracket shooting.

2. Description of the Related Art

Even photos of the same shooting scene show different expression depending on settings of the settings for shooting (exposure, in-focus position, WB, and the like) of an image pickup apparatus. For this reason, it is not easy for the user to select the most appropriate settings for shooting for a shooting scene. To address this issue, an image pickup apparatus is conventionally known in which the bracket shooting is performed by altering an exposure, an in-focus position, a WB setting, and the like which are previously set when a user takes an image of a shooting scene such as a scene containing a plurality of objects and a high-contrast scene, for which settings for shooting are difficult to set.

Japanese Patent Laid-open No. 2006-67464 discloses a digital camera in which the bracket shooting can be performed. A digital camera disclosed in Japanese Patent Laid-open No. 2006-67464 takes images of the same object based on a plurality of parameters, generates a plurality of images, and shows the images at different timings with respect to each step of the parameter.

However, in order to effectively utilizes functions of the bracket shooting as disclosed in Japanese Patent Laid-open No. 2006-67464, it is necessary to set appropriate parameters depending on the shooting scene when performing the bracket shooting. For this reason, the bracket shooting requires cumbersome settings and advanced knowledge, and it is difficult to perform the bracket shooting appropriate to the shooting scene.

BRIEF SUMMARY OF THE INVENTION

The present invention provides an image pickup apparatus, an image pickup system, and a method of controlling an image pickup apparatus capable of performing a bracket shooting suitable for a shooting scene without requiring a cumbersome setting or an advanced knowledge.

An image pickup apparatus as one aspect of the present invention includes a shooting scene determining unit configured to determine a shooting scene, a selecting unit configured to select a bracket shooting from a plurality of bracket shootings which alter parameters in different ways from each other, based on the shooting scene determined by the shooting scene determining unit, and an image pickup unit configured to perform the bracket shooting selected by the selecting unit, and the selecting unit selects one type of bracket shooting even when the shooting scene determined by the shooting scene determining unit is suitable for at least two types of bracket shootings in the plurality of bracket shootings.

An image pickup apparatus as another aspect of the present invention includes a shooting scene determining unit configured to determine a shooting scene, an image pickup unit configured to perform a bracket shooting based on the shooting scene determined by the shooting scene determining unit, and an image processor configured to generate a plurality of images by performing a plurality of types of bracket image processing on a shot image obtained by the bracket shooting.

An image pickup system as another aspect of the present invention includes the image pickup apparatus and an image pickup optical system removably mounted on the image pickup apparatus.

A method of controlling an image pickup apparatus as another aspect of the present invention includes a determination step of determining a shooting scene, a selection step of selecting a bracket shooting from a plurality of bracket shootings which alter parameters in different ways from each other, based on the shooting scene determined in the determination step, and a shooting step of performing the bracket shooting selected in the selection step, and in the selection step, one type of bracket shooting is selected even when the shooting scene determined in the determination step is suitable for at least two types of the bracket shootings in the plurality of bracket shootings.

A method of controlling an image pickup apparatus as another aspect of the present invention includes a determination step of determining a shooting scene, a shooting step of performing a bracket shooting, based on the shooting scene determined in the determination step, and an image processing step of generating a plurality of images by performing a plurality of types of bracket image processing on a shot image obtained in the shooting step.

Further features and aspects of the present invention will become apparent from the following description of exemplary embodiments with reference to the attached drawings.

DETAILED DESCRIPTION OF THE PREFERRED EMBODIMENTS

Figure 1:
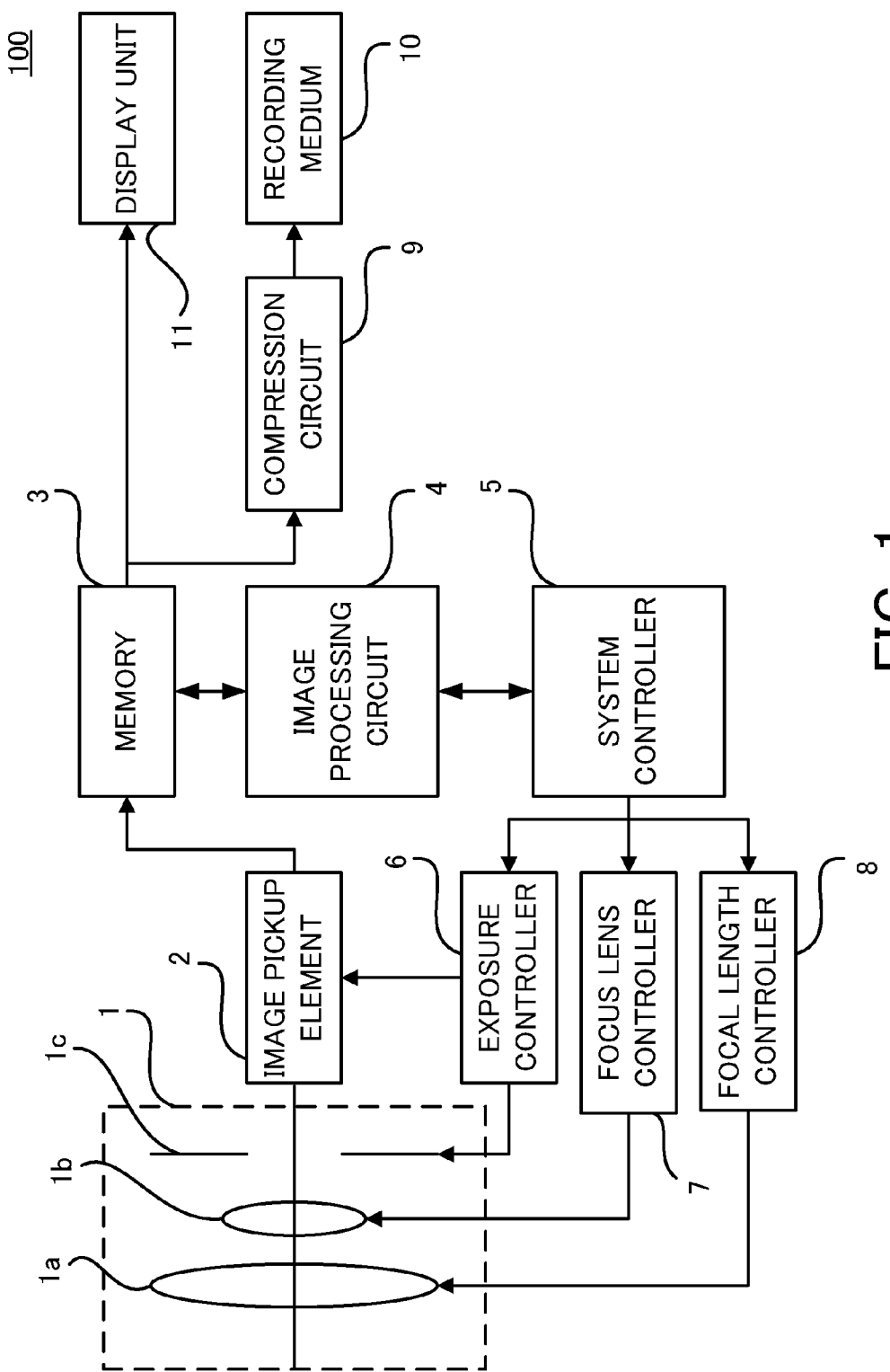
FIG. 1 is a block diagram of an image pickup apparatus in the present embodiment.

Exemplary embodiments of the present invention will be described below with reference to the accompanied drawings. In each of the drawings, the same elements will be denoted by the same reference numerals and the duplicate descriptions thereof will be omitted.

First of all, referring to FIG. 1, a configuration of an image pickup apparatus in the present embodiment will be described. FIG. 1 is a block diagram of an image pickup apparatus 100. In the image pickup apparatus 100, reference numeral 1 denotes an image pickup optical system. The image pickup optical system 1 is configured by a plurality of lenses including a zoom lens 1$a$ and a focus lens 1$b$ (a ranging lens) and an aperture stop mechanism 1$c$.

Reference numeral 2 denotes an image pickup element configured by including a CCD or a CMOS. The image pickup element 2 performs photoelectric conversion of an object image (on optical image) obtained via the image pickup optical system 1 to generate an electric signal (an analog signal). The image pickup element 2 includes an A/D converter for converting the analogue signal to a digital signal. Further, the surface of the image pickup element 2 is covered with RGB color filters having a Bayer array so that taking color pictures can be performed. When the object image is formed on the image pickup element 2, image data (image signals) are generated and are stored in a memory 3. Reference numeral 3 denotes the memory, which stores image signals generated by the image pickup element 2 and data required for various image processing.

Reference numeral 4 denotes an image processing circuit (an image processing unit) which performs various image processing including a predetermined pixel interpolation process and a color conversion process on the image signal stored in the memory 3. The image processing circuit 4 performs predetermined calculation processing by using the image data obtained by the shooting, determines a shooting condition based on the obtained result of the calculation, and notifies a system controller 5 of the shooting condition. Further, the image processing circuit 4 has functions of image analysis, a filtering process, image combining processing, and the like, and includes a bracket processing selection unit which selects a bracket image processing suitable for a shooting scene in accordance with an algorism described below.

Reference numeral 5 denotes a system controller which controls an entirety of the image pickup apparatus 100. The system controller 5 generally controls a shutter speed, the aperture stop mechanism, the focus lens, and the zoom lens by controlling an exposure controller 6, a focus lens controller 7, and a focal length controller 8 to shoot an image with the shooting setting determined by the image processing circuit 4. The system controller 5 further includes a shooting scene determining unit, a selecting unit, and an image pickup unit as described below.

Reference numeral 6 denotes an exposure controller which appropriately controls an exposure by adjusting an exposure time and a shooting sensitivity of the aperture stop mechanism 1c of the image pickup optical system 1 and the image pickup element 2. Reference numeral 7 denotes the focus lens controller which controls the focus lens 1b of the image pickup optical system 1. Reference numeral 8 denotes the focal length controller which controls the zoom lens 1a of the image pickup optical system 1, which changes a focal length based on an instruction of the system controller 5.

Reference numeral 9 denotes a compression circuit which compresses an image stored in the memory 3 into a JPEG image or the like. The image (the compressed image) generated by the compression circuit 9 is recorded in a recording medium 10. Reference numeral 11 denotes a display unit which reads out the shot image generated by the image processing circuit 4 from the memory 3 to display the image on an LCD or an external monitor provided on the image pickup apparatus 100.

The image pickup element 2, the memory 3, the image processing circuit 4, the system controller 5, the compression circuit 9, the recording medium 10, and the display unit 11 are connected to a bus (not shown), and communicate the image data via the bus.

In the present embodiment, the image pickup apparatus 100 is integrally configured by an image pickup apparatus body having the image pickup element 2 and the image pickup optical system 1. However, the present embodiment is not limited thereto, and the embodiment can also be applied to an image pickup system that is configured by the image pickup apparatus body and the image pickup optical system removably mounted on the image pickup apparatus body.

Figure 2:
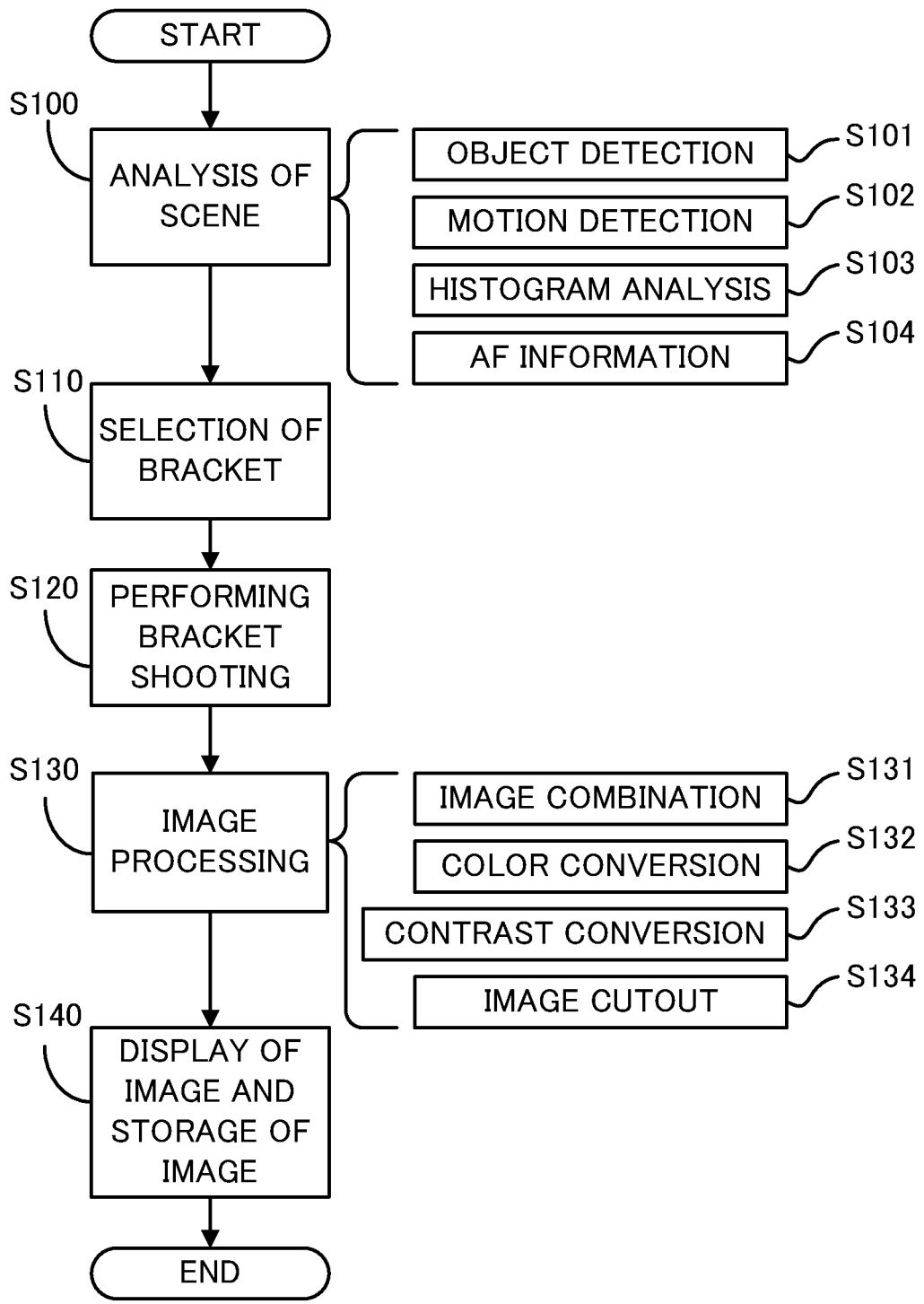
FIG. 2 is a flowchart of a bracket shooting process in the present embodiment.

Next, referring to FIG. 2, an algorism of the bracket shooting process which is performed by the image pickup apparatus 100 of the present embodiment will be described. FIG. 2 is a flowchart of the bracket shooting process. Each step of FIG. 2 is mainly performed based on the instruction of the system controller 5.

First of all, in step S100, the system controller 5 (a shooting scene determining unit) analyzes (determines) a shooting scene. The shooting scene is determined while an electronic view finder (an EVF) is displaying a moving image (while standing by for shooting). Specifically in the present embodiment, in order to analyze the shooting scene, first, in step S101, the system controller 5 detects an object by performing human detection using face detection, main object detection, or the like. Then, in step S102, the system controller 5 detects a motion of the image pickup apparatus 100 or the object. Further, in step S103, the system controller 5 performs a histogram analysis of the image displayed on the electronic view finder (the EVF). Then, in step S104, the system controller 5 performs a focus scan. The system controller 5 determines the shooting scene based on the result of the object detection, the result of the motion detection, the result of the histogram analysis, and the AF information obtained in steps S101 to S104. However, the embodiment is not limited thereto, and other information may also be used to determine the shooting scene.

Subsequently, in step S110, the system controller 5 (a selecting unit) selects an appropriate bracket based on the shooting scene (the result of the shooting scene analysis) analyzed (determined) in step S100. That is, the system controller 5 selects one parameter (one bracket) from a plurality of types of parameters (a plurality of types of brackets). Thus, in accordance with the result of the shooting scene analysis, the type of bracket shooting (the parameter to be altered when performing the bracket shooting) to be used is automatically determined.

In the present embodiment, as the parameters (the types of bracket), for example, an exposure bracket for altering an exposure (an exposure amount), a focus bracket for altering a focused position, a WB bracket for altering a white balance coefficient, and the like are included. In addition, the bracket as a parameter includes a shutter speed bracket for altering a shutter speed when shooting and a timing bracket for altering a timing of releasing a shutter. Thus, in the present embodiment, the system controller 5 can select an appropriate parameter (a suitable parameter) from the plurality of types of parameters in accordance with (depending on) the shooting scene. Therefore, the system controller 5 can select a bracket shooting (any one of the bracket shootings) from at least two types of bracket shootings to perform the bracket shooting.

In the embodiment, an example in which the parameters to be altered are different for each of the types of brackets, however, the embodiment is not limited thereto. As long as each bracket shooting alters a plurality of parameters, the parameters to be altered may be partially duplicated between a plurality of bracket shootings. The way of altering (changing) the parameter only has to be different between the bracket shootings.

Figure 3:
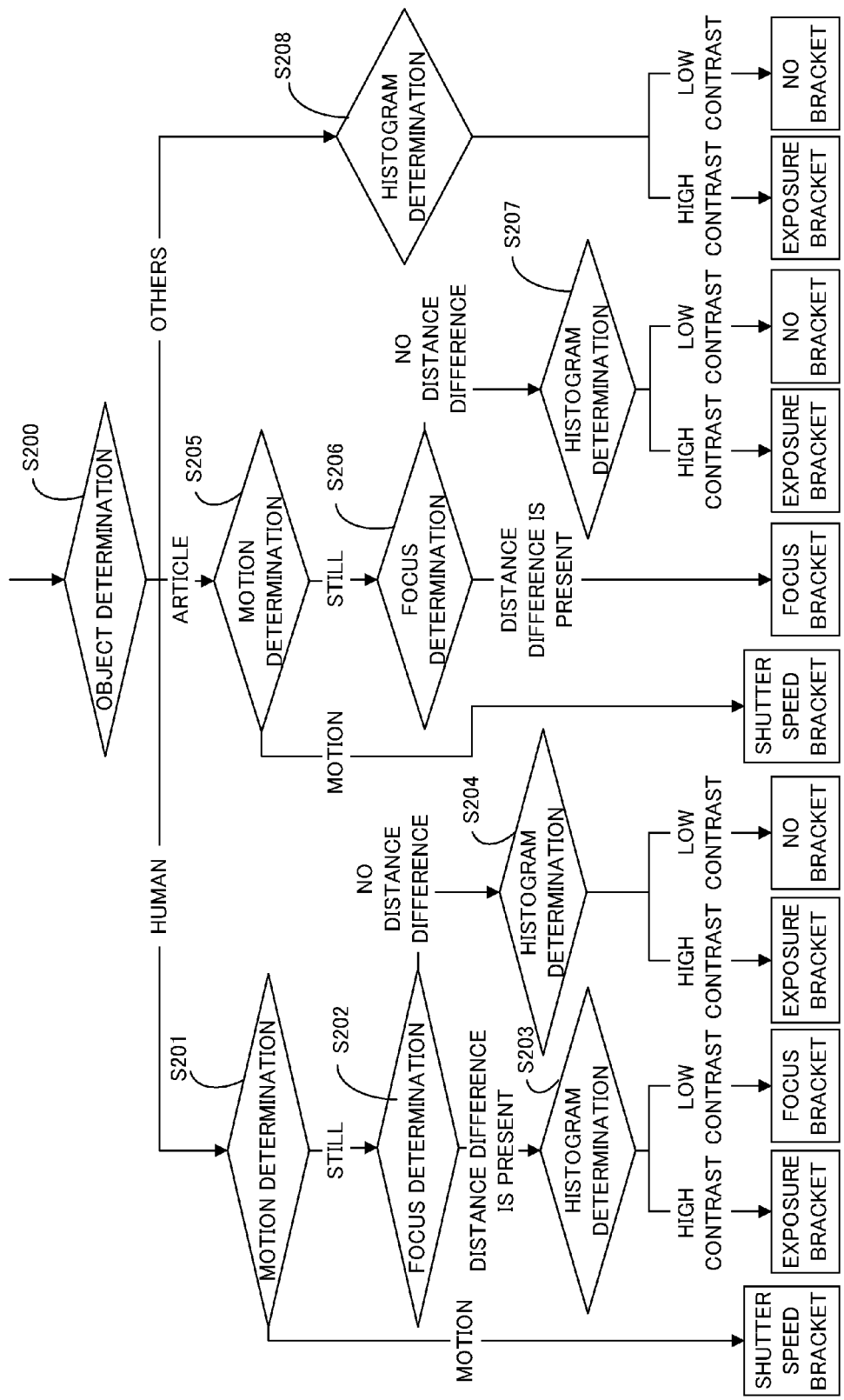
FIG. 3 is a flowchart of an algorism for selecting a parameter in the present embodiment.

Subsequently, referring to FIG. 3, an algorism of selecting a parameter suitable for a shooting scene will be described as an example of an image pickup apparatus (a camera) having functions (three types of parameters) of the exposure bracket, the focus bracket, and the shutter speed bracket. FIG. 3 is a flowchart (an example) of the algorism of selecting the parameter in the present embodiment. Each step of FIG. 3 is mainly executed based on the instruction of the system controller 5.

First of all, in step S200, the system controller 5 performs an object determination based on the result of the object detection obtained in step S101 of FIG. 2. As the result of the object determination, the system controller 5 determines which of the following three types of objects of a human, an article, and others (a scene containing no specific object such as a landscape) is the object (the detected object). When the object is a human, the flow proceeds to step S201, and on the other hand, when the object is an article, the flow proceeds to step S205. Alternatively, when the object is others, the flow proceeds to step S208.

In step S201 or step S205, the system controller 5 performs a motion determination based on the result of the motion detection obtained in step S102 of FIG. 2. As the result of the motion determination, when it is determined that at least one object is present in a shooting angle of view, and there is a hand shake or an object motion (a motion), i.e. the image pickup apparatus 100 or the object is moving, the shutter speed bracket is selected. In the shutter speed bracket, a plurality of shootings are performed while altering the shutter speed when shooting, and thus, the difference in the expression of the object motion and failure in shooting due to a hand shake or an object shake (an image blur) can be avoided. As a detector which detects the motion of the image pickup apparatus 100 or the object, a gyro sensor provided in the image pickup apparatus 100 can be used to detect the hand shake based on an output of the gyro sensor. Alternatively, the object in the displayed image on the EVF may be tracked by performing a pattern matching or the like to detect an amount of the motion of the object.

In step S201 or step S205, when it is determined that the object stands still, the flow proceeds to step S202 or step S206, respectively. In step S202 or step S206, the system controller 5 performs a focus determination based on the result of the focus scan (AF information) obtained in step S104 of FIG. 2. In the present embodiment, the system controller 5 estimates a distances from the image pickup apparatus 100 to the object and a distance from the object to the background for each object in the shooting angle of view. When a plurality of objects are contained and their distances are different, i.e. a distance difference is present (large), a priority is put on the focus bracket shooting in which images are taken by focusing on respective objects. Alternatively, the images may be taken by the focus bracket shooting at a plurality of predetermined focus positions when the shooting scene is difficult to focus on the object in such a case that the object has a low contrast or close-up photography (macro-photography) is taken.

When the distance difference is present (large) in step S202, the flow proceeds to step S203. On the other hand, when the distance difference is not present (small) in step S202, the flow proceeds to step S204. When the distance difference is present (large) in step S206, the focus bracket shooting is selected. On the other hand, when the distance difference is not present (small) in step S206, the flow proceeds to step S207.

In step S203, S204, S207, or S208, the system controller 5 performs a histogram determination based on the result of the histogram analysis in step S103 of FIG. 2. In the present embodiment, the system controller 5 generates the luminance histogram of the EVF display image, and performs a contrast determination from the distribution of the histogram. Here, when it is determined that the shooting scene has a high contrast (contrast difference) and is difficult to set an exposure, the exposure bracket in which a plurality of images are taken while altering the exposure is selected.

On the other hand, in step S203, when it is determined that the contrast is low, the system controller 5 selects the focus bracket. In step S204, S207, or S208, it is determined that the contrast is low, the system controller 5 does not perform any bracket shootings, considering that any type of bracket shooting is ineffective. Thus, when it is determined that the shooting scene requires no bracket shooting, the system controller 5 performs a normal single shooting, and therefore the shooting time can be reduced compared to the case of performing the bracket shooting. The present embodiment is not limited to this, and the configuration may be made such that at least any one bracket (for example, the exposure bracket) is surely selected. In this case, the configuration is made such that a bracket shooting previously set is performed, for example.

In the present embodiment, when the shooting scene determining unit determines that there is a distance difference greater than a predetermined distance between at least two objects in the shooting scene, the image pickup unit performs the focus bracket shooting. When the shooting scene determining unit determines that the contrast of the shooting scene is higher than a predetermined contrast, the image pickup unit performs the exposure bracket shooting. When the shooting scene determining unit determines that the object in the shooting scene or the image pickup apparatus is moving, the image pickup unit performs a shutter speed bracket shooting or a continuous shooting.

In the embodiment, the selecting unit changes one parameter selected from a plurality of types of parameters in accordance with (depending on) the type of the object contained in the shooting scene. Alternatively, when any selection condition of the selecting unit cannot be satisfied, the image pickup unit performs a single shot or a predetermined type of bracket shooting.

In the present embodiment, in the case that the focus bracket shooting and the exposure bracket shooting are both possible for a shooting scene, when the object is a human, priority is put on the exposure bracket shooting depending on the result of the histogram determination. On the other hand, if the object is an article, priority is put on the focus bracket shooting. However, the embodiment is not limited thereto.

The image pickup apparatus 100 of the present embodiment can automatically determine an appropriate parameter (an appropriate type of brackets) depending on the image shooting scene (the image shooting information) obtained during the stand-by condition, in accordance with the algorism described with reference to FIG. 3. As another example of the present embodiment, a combination of the types of the bracket items or a determination condition may be changed to adopt a configuration different from the configuration of FIG. 3. For example, when it is determined the image pickup apparatus 100 or the object is moving, the system controller 5 can be configured so as to select the continuous shooting.

The image pickup apparatus 100 of the present embodiment is not configured such that both the focus bracket shooting and the exposure bracket shooting are performed when a plurality of objects are determined to have distance differences and the contrast is determined to be high. In this case, even when the object has a distance difference, only the exposure bracket is performed without performing the focus bracket.

That is to say, the image pickup apparatus 100 selects exclusively one type of the bracket shootings even when two or more types of bracket shootings are suitable for the shooting scene. This is because a larger amount of the memory capacity is required for storing a shot image and it takes longer time for the bracket shooting to be completed if the plurality of types of bracket shootings are performed all at once.

In step S110 of FIG. 2, when one type of the bracket items is selected, the flow proceeds to step S120. Then, in step S120, the system controller 5 (an image pickup unit) alters (changes) a value of the one parameter selected in step S110 to perform the bracket shooting. The memory 3 of the image pickup apparatus 100 stores a plurality of shot image data.

Subsequently, in step S130, the image processing circuit 4 performs different types of image processing including bracket image processing on the plurality of image data. In the present embodiment, specifically, first in step S131, the image processing circuit 4 performs the image combining processing. The image processing circuit 4 performs the image combining processing to generate a high dynamic range image from the plurality of images obtained by the exposure bracket shooting. Subsequently, in step S132, the image processing circuit 4 performs a color conversion process to add a special color effect. Then, in step S133, the image processing circuit 4 performs a gamma conversion by a contrast conversion process. Further, in step S134, the image processing circuit 4 performs an image cutout process to change an aspect ratio or a size of the image. Thus, the image processing circuit 4 can perform the bracket processing that generates more variations of images from the plurality of shot original images by performing different types of image processing.

Subsequently, referring to FIG. 4, a method of performing the bracket processing by the image processing (the bracket processing by the image processing circuit 4) in step S130 of FIG. 2 on the images taken by the bracket shooting will be described.

Figure 4:
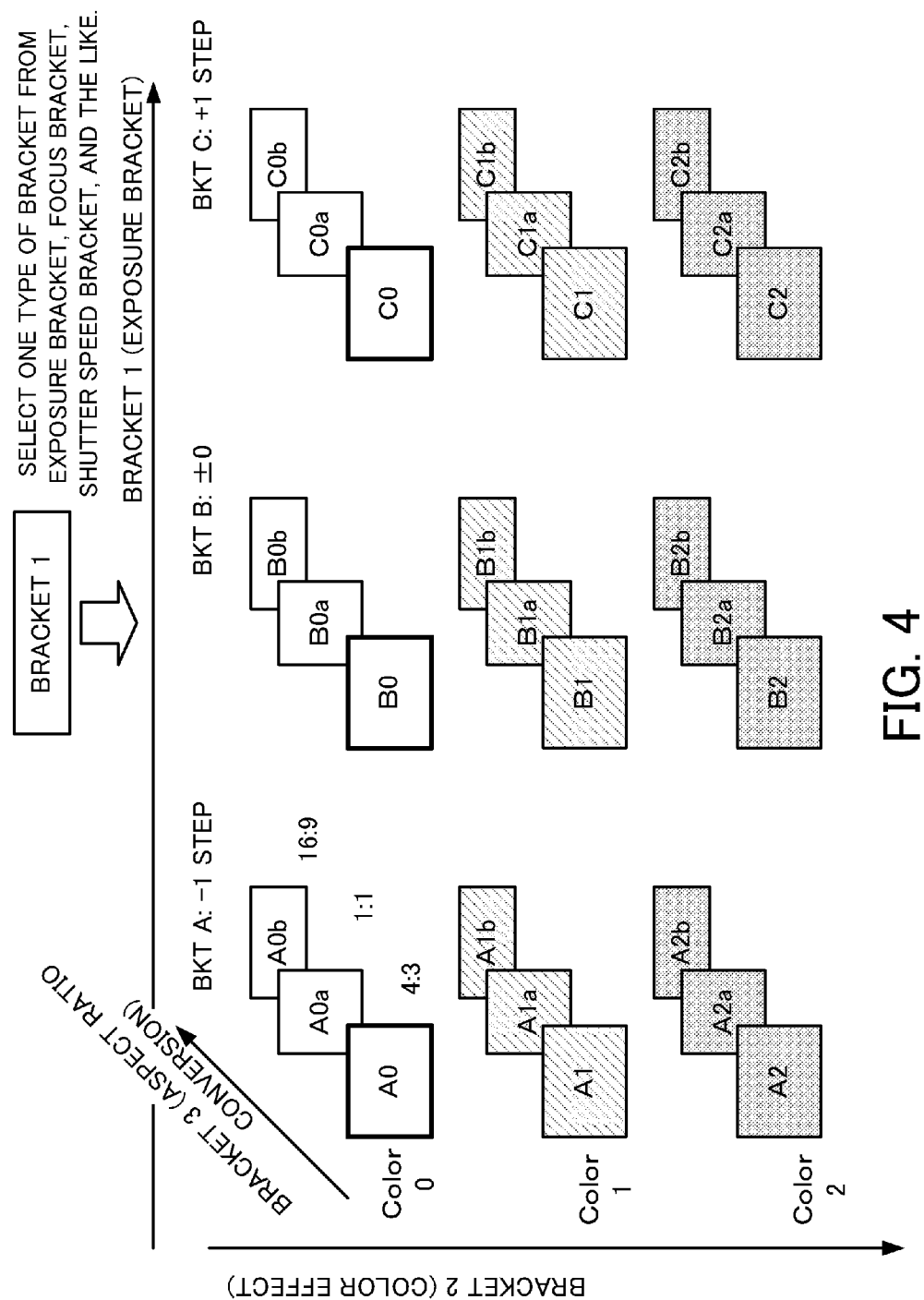
FIG. 4 is an example of a group of images generated by a bracket processing in the present embodiment.

FIG. 4 is an example of a group of images generated by the bracket processing. In FIG. 4, Bracket 1 denotes a parameter (a type of bracket) selected in step S110 of FIG. 2. In Bracket 1, the bracket shooting is performed with respect to the selected one type of parameter and images whose number is N (in the embodiment, exposure bracketing, where N=3) are taken.

Bracket 2 and Bracket 3 of FIG. 4 denote the bracket processing performed in the image processing performed in step S130 of FIG. 2. In the present embodiment, Bracket 2 and Bracket 3 are supposed to be a process for converting color shade (a color effect processing) and a process for converting an aspect ratio (an aspect ratio conversion processing) by cutting-out of an image, respectively. In each of the color effect processing and the aspect ratio conversion processing, three types of variations of images are generated. In other words, with respect to Bracket 1 (the exposure bracket), the three types of images BktA (−1 step), BktB (±0 step), and BktC (+1 step) are generated. With respect to Bracket 2 (the color effect), the three types of images Color 0, Color 1, and Color 2 are generated. With respect to Bracket 3 (the aspect ratio conversion), the three types of images A0 (4:3), A0a (1:1), and A0b (16:9) are generated. Therefore, in the present embodiment, finally, 3×3×3=27 types of images can be generated with respect to a single shooting. Accordingly, this arrangement enables a user to select an appropriate image (most favorite image for the user) from a plurality of images which are different in the exposure, the color shade, and the aspect ratio.

Thus, the image processing circuit 4 can generate more images by performing the bracket image processing on the shot image obtained by the image pickup unit by changing the values of the plurality of parameters different from the parameters altered when bracket shooting.

Here, the image processing includes, besides the ones described above, many types such as a processing for blurring a whole image, a processing for distorting a whole image, a processing for intensifying contrast of a whole image, and a processing for correcting an aberration of an image. Thus, many combination patterns of image processing can be available, and many images are generated if all the combinations of image processing are used to perform the bracket processing.

To address this issue, in the present embodiment, the image processing circuit 4 automatically selects the type of the image processing to be used to perform the bracket image processing on the plurality of images obtained by the bracket shooting. Referring to FIG. 5 to FIG. 8, a method of automatically selecting the combination of bracket image processing will be described. In the following description, an example in which the exposure bracket is selected as the bracket shooting (Bracket 1), and the color effect filter processing and the aspect ratio conversion processing are used as the bracket image processing (Brackets 2 and 3) is described. It is assumed that the three images are generated in the exposure bracket as described above.

Figure 5:
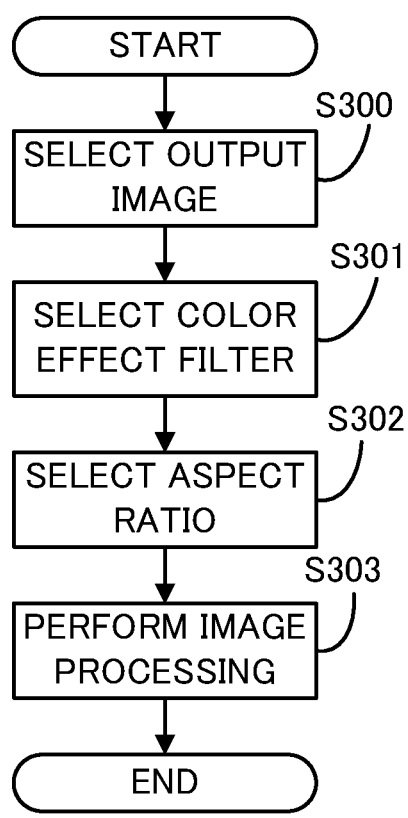
FIG. 5 is a flowchart of a bracket image processing in the present embodiment.
Figure 6:
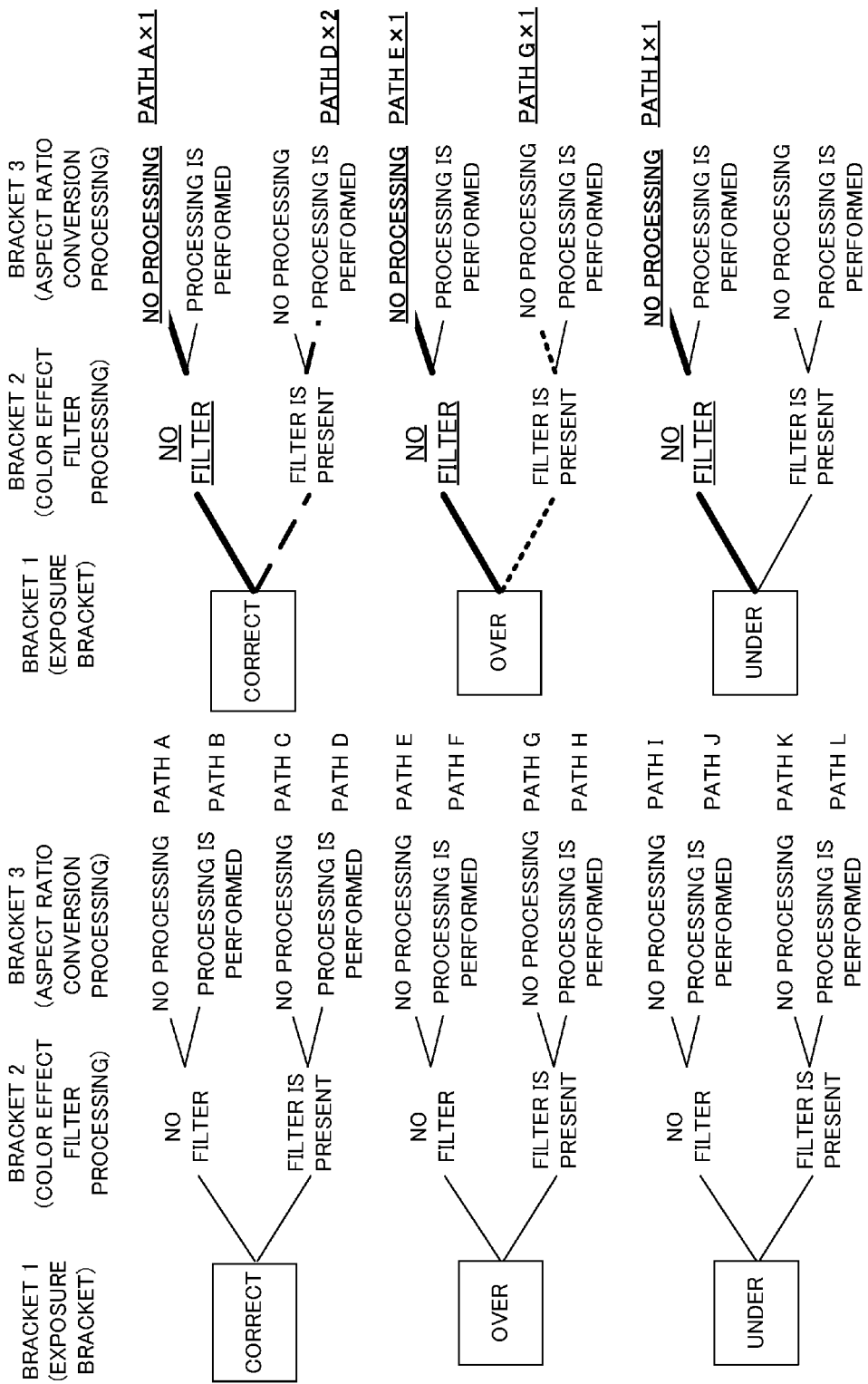
FIGS. 6A and 6B are diagrams of describing how to determine a path of an image processing in the present embodiment.

FIG. 5 is a flowchart of the bracket image processing, and FIGS. 6A and 6B are diagrams of describing how to determine the path of the image processing.

First of all, in step S300 of FIG. 5, the system controller 5 determines a content of processing on the image to be finally output. For example, in the case that the user needs M number of images, the system controller 5 determines the processing paths for M number of images (in the embodiment, M=6), as illustrated in FIG. 6B, from the processing paths A to L which branch off as illustrated in FIG. 6A depending on the presence or absence of bracket processing.

In the embodiment, a method of determining the processing paths is performed by selecting the appropriate paths for M images in accordance with the type of the selected bracket or the result of the determination of the object, from among some patterns previously set. For example, when Bracket 1 is the exposure bracket, the processing paths for M images are determined in accordance with the following rule, for example, as illustrated in FIG. 6B.

(1) Select many images generated from over-exposure images.

(2) Leave one image for which both the color effect processing and the aspect conversion processing have not been performed for each of the images obtained by the exposure bracket.

The configuration may be made such that the value of M and the selection of the processing path can be arbitrarily designated by the user in advance.

Figure 7:
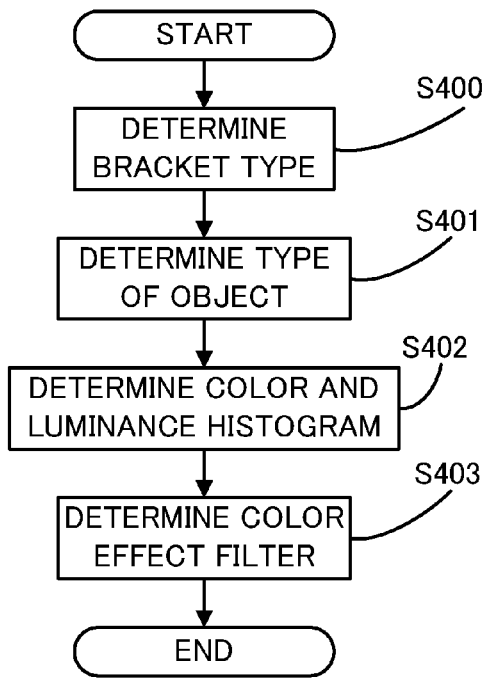
FIG. 7 is a flowchart of a color effect processing in the present embodiment.

Then, in step S301, the system controller 5 determines a content of the color effect processing to be applied to the image. The color effect filter includes the processes for converting the color phase, the saturation (the chroma), or the luminosity with respect to an entirety or a part of the image. Referring to FIG. 7, the processing will be described below.

FIG. 7 is a flowchart of the color effect processing. In the present embodiment, the image pickup apparatus has P types of color effect filters, and the probability of each filter being used is determined by a filter weight $W[i]$ ($i=0, 1, \ldots, P$). In step S400, the system controller 5 changes the weight W depending on the type of Bracket 1. For example, when Bracket 1 is the exposure bracket, priority is put on the color effect filter for altering the color phase or the saturation instead of the color effect filter for altering the luminosity. In other words, each filter weight $W[i]$ is weighted so as to put priority on the parameter which affects differently from the parameter altered in Bracket 1. Specifically, a coefficient p1[i] (i=0, 1, . . . , P) is previously prepared for changing the weight, depending on the type of Bracket 1, and multiplying the weight W[i] by the coefficient p1[i] as represented in the following Expression (1) gives a new weight W[i].

$$W[i]=W[i]\times p1[i] \quad (1)$$

In step S401, the system controller 5 further multiplies the weight W[i] obtained in step S400 by a new coefficient p2[i] (i=0, 1, . . . , P), depending on the result of the object determination as represented by Expression (2) to get a new weight W[i]. For example, the coefficient p2[i] is set to satisfy the following conditions.

(3) When the object is a human, the weight of a color effect filter which significantly changes the color phase of the skin color is reduced while putting priority on color effect filters related to sepia and soft focus.

$$W[i]=W[i]\times p2[i] \quad (2)$$

In step S402, the system controller 5 further multiplies the weight W[i] obtained in step S401 by a new coefficient p3[i] (i=0, 1, . . . , P) as represented by the following Expression (3) to get a new weight W[i]. The coefficient p3[i] is set depending on the color distribution and the luminance distribution of the shot image.

Figure 8:
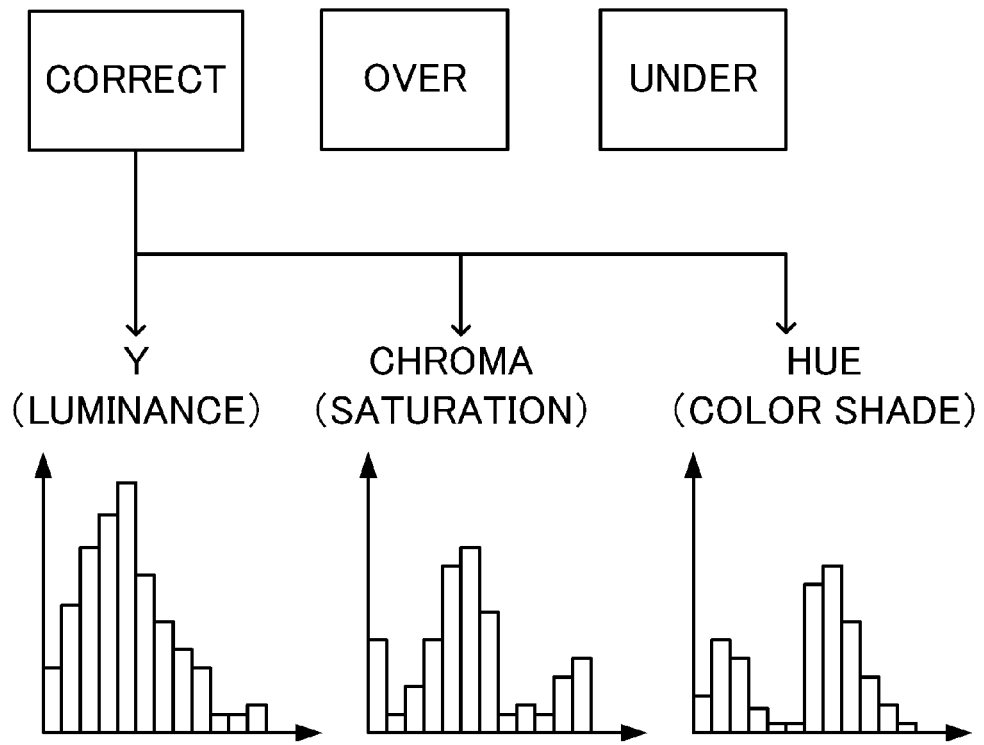
FIG. 8 is an example of histograms of luminance, saturation, and color phase generated from a shot image in the present embodiment.

FIG. 8 illustrates histograms of the luminance (Y), the saturation (Chroma), and the color phase (Hue) generated from the shot image. As illustrated in FIG. 8, the histograms of the luminance, the saturation, and the color phase are each generated from each of the data of the images taken by Bracket 1, and a new coefficients p3[i] (i=0, 1, . . . , P) is set depending on the results.

$$W[i]=W[i]\times p3[i] \quad (3)$$

For example, the coefficient p3[i] is set to satisfy the following conditions, for example.

(4) When the contrast of the shot image is determined to be low based on the histogram of the luminance, priority is put on the color effect filter for performing a contrast intensifying process.

(5) When the saturation of the shot image is determined to be high based on the histogram of the saturation, priority is put on the color effect filter for intensifying the saturation.

(6) When a blue area is determined to be major in the shot image based on the histogram of the color phase, priority is put on the color effect filter for intensifying the saturation of blue.

In step S403, the system controller 5 determines the color effect filter to be applied, based on the weight W[i] obtained in step S402.

The color effect filter may be selected so as to obtain the final weight W which exerts the highest effect, or alternatively selected to have some unpredictability while considering the weighting such that the filter is selected at random from the filters having weights W which exert high effects.

As described above, the color effect filter to be applied to each image can be selected depending on the type of the bracket shooting and the result of the analysis of the shot image.

Going back to FIG. 5, in step S302, the system controller 5 determines a content of the aspect ratio conversion processing. The aspect ratio of the image after the aspect ratio conversion processing is performed is determined based on the size of the image before the aspect ratio conversion processing is performed or the result of the object determination. For example, when the object is a human, the 3:4 portrait composition is prioritized, and when the object is a landscape, the 16:9 landscape composition is prioritized. Alternatively, one may be selected at random from the aspect ratios previously prepared.

Then, in step S303, the image processing circuit 4 performs the image processing based on the color effect filter selected in step S301 and the aspect ratio selected in step S302.

As described above, at the time of shooting, one type of the bracket shooting which is optimally selected from the plurality of bracket shootings is performed, and subsequently, a bracket processing is performed by the image processing with respect to the color effect and the aspect ratio conversion processing. In this way, one shoot can generate a plurality of images and provide a plurality of different image expressions to the user.

After the image processing circuit 4 (the image processing) completes the bracket image processing, the flow proceeds to step S140 of FIG. 2. In step S140, the system controller 5 displays the generated images (the images stored in the memory 3) on the display unit 11. At this time, the user can select, from the generated images, the image which the user would like to record and store the image in the recording medium 10.

As described above, the image pickup apparatus of the embodiment can reduce the probability of failure in taking an image and provide the user with a desired image at high probability by automatically selecting an appropriate bracket shooting depending on the result of the shooting scene analysis. In addition, by performing a plurality of image processings such as the color effect and an image cutout on the shot image, it is easy to obtain the images having a plurality of different image expressions. Therefore, according to the present embodiment, an image pickup apparatus, an image pickup system, and a method of controlling the image pickup apparatus capable of performing a bracket shooting suitable for a shooting scene without requiring a cumbersome setting or an advanced knowledge can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-277880, filed on Dec. 20, 2012, which is hereby incorporated by reference herein in its entirety.

What is claimed is:

1. An image pickup apparatus comprising:
an image pickup element; and
a system controller configured to:
determine a shooting scene by analyzing a moving image,
select, based on the shooting scene, a bracket mode from a plurality of bracket modes, and
perform the bracket mood using the image pickup element,
wherein types of parameters altered by each of the bracket modes are different with each other, and the system controller selects one type of bracket mode even when the determined shooting scene is suitable for at least two types of bracket modes in the plurality of bracket modes.

2. The image pickup apparatus according to claim 1, wherein the system controller determines whether an object is a human, and
changes a way to select the bracket mode in accordance with a result of the determination of whether the object is the human.

3. The image pickup apparatus according to claim 1, wherein when there is a distance difference not less than a predetermined distance between at least two objects contained in the shooting scene, the system controller selects a focus bracket mode.

4. The image pickup apparatus according to claim 1, wherein when the shooting scene has a contrast higher than a predetermined contrast, the system controller selects an exposure bracket mode.

5. The image pickup apparatus according to claim 1, wherein when at least one of an object in the shooting scene and the image pickup apparatus is moving, the system controller selects one of a shutter speed bracket mode or a continuous shooting mode.

6. The image pickup apparatus according to claim 1, further comprising an image processor configured to generate a plurality of images by performing a plurality of types of bracket image processing on a shot image obtained using the image pickup element.

7. The image pickup apparatus according to claim 6, wherein the image processor selects a type of the parameter to be altered in the bracket image processing in accordance with the bracket mode selected by the system controller.

8. An image pickup apparatus comprising:
an image pickup element;
a system controller configured to determine a shooting scene by analyzing a moving image, and
perform a bracket shooting based on the shooting scene using the image pickup element; and
an image processor configured to generate a plurality of images by performing a plurality of types of bracket image processing on a shot image obtained by the bracket shooting.

9. The image pickup apparatus according to claim 8, wherein the system controller selects a bracket shooting from a plurality of bracket shootings which alter parameters in different ways from each other, based on the shooting scene, and
wherein the image processor determines the plurality of types of bracket image processing in accordance with which bracket shooting is selected by the system controller.

10. The image pickup apparatus according to claim 8, further comprising a display unit configured to display a plurality of images generated by the image processor and at least one image which is a shot image obtained by the bracket shooting and on which the bracket image processing has not been performed.

11. A method of controlling an image pickup apparatus, the method comprising:
a determination step of determining a shooting scene by analyzing a moving image;
a selection step of selecting a bracket mode from a plurality of bracket modes based on the shooting scene determined in the determination step; and
a shooting step of performing the bracket mode selected in the selection step;
wherein types of parameters altered by each of the bracket modes are different with each other, and in the selection step, one type of bracket mode is selected even when the shooting scene determined in the determination step is suitable for at least two types of the bracket modes in the plurality of bracket modes.

12. A method of controlling an image pickup apparatus, the method comprising:

a determination step of determining a shooting scene by analyzing a moving image;
a shooting step of performing a bracket shooting, based on the shooting scene determined in the determination step; and
an image processing step of generating a plurality of images by performing a plurality of types of bracket image processing on a shot image obtained in the shooting step.

13. An image pickup apparatus comprising:
an image pickup element; and
a system controller configured to:
determine a shooting scene,
select, based on the shooting scene, a bracket mode from a plurality of bracket modes, and
perform the bracket mode using the image pickup element,
wherein types of parameters altered by each of the bracket modes are different with each other and, the system controller determines whether an object is a human, and changes a way to select the bracket mode in accordance with a result of the determination of whether the object is the human.

14. The image pickup apparatus according to claim 13, wherein when there is a distance difference not less than a predetermined distance between at least two objects contained in the shooting scene, the system controller selects a focus bracket mode.

15. The image pickup apparatus according to claim 13, wherein when the shooting scene has a contrast higher than a predetermined contrast, the system controller selects an exposure bracket mode.

16. The image pickup apparatus according to claim 13, wherein when at least one of an object in the shooting scene and the image pickup apparatus is moving, the system controller selects one of a shutter speed bracket mode or a continuous shooting mode.

17. The image pickup apparatus according to claim 13, further comprising an image processor configured to generate a plurality of images by performing a plurality of types of bracket image processing on a shot image obtained using the image pickup element.

18. The image pickup apparatus according to claim 6, wherein the image processor selects a type of the parameter to be altered in the bracket image processing in accordance with the bracket mode selected by the system controller.

19. A method of controlling an image pickup apparatus, the method comprising:
a determination step of determining a shooting scene;
a selection step of selecting a bracket mode from a plurality of bracket modes, based on the shooting scene determined in the determination step; and
a shooting step of performing the bracket mode selected in the selection step,
wherein types of parameters altered by each of the bracket modes are different with each other and, in the determination step, whether an object is a human is determined, and in the selection step, a way to select the bracket mode is changed in accordance with a result of the determination of whether the object is the human.

* * * * *